123,713

UNITED STATES PATENT OFFICE.

PAUL MARCELIN, OF NEW YORK, ASSIGNOR TO HIMSELF, FRANKLIN OSGOOD, OF NEW BRIGHTON, AND ROBERT WARREN, OF BROOKLYN, NEW YORK.

IMPROVEMENT IN THE MANUFACTURE OF SULPHUROUS ACID.

Specification forming part of Letters Patent No. 123,713, dated February 13, 1872.

Specification describing a new and Improved Process for Manufacturing Liquid Sulphurous Acid, invented by PAUL MARCELIN, of New York city, in the county and State of New York.

My improved process consists in the production of sulphurous acid by the decomposition of sulphate of iron with sulphur, in a retort of any suitable kind, in the proportion of about one-third sulphur to two-thirds of the sulphate of iron; but I do not limit myself to these proportions.

By this mode of procedure I produce sulphurous acid about ninety-eight per cent. pure acid. When this pure acid, in a gaseous state, comes in contact with water it enables me to obtain a very concentrated solution of sulphurous acid. The sulphate of iron is first well dried, then put in a retort or any suitable vessel with the sulphur, and the process of decomposition set in action by the application of very strong heat. The operation may be conducted in a muffle or other suitable furnace, such as is used in the manufacture of coal-gas. The common clay retorts are preferred, but others may be used. The decomposition will take place at a bright cherry-red heat. The pure gas is produced by this process, wholly free from sulphuric acid or deleterious gases.

The acid prepared by this process has great advantages, in the sugar manufacture, over that produced by the methods now in use, since it is not contaminated with sulphuric acid, nitrogen, atmospheric air, carbureted hydrogen, and like compounds, which are found more or less in the sulphurous acid as manufactured heretofore. It may, therefore, be introduced directly into the vacuum-pan, and will not convert any of the sugar into the non-crystallizable form or corrode the pan; and, when applied directly to the cane or other saccharine juice, the full yield of sugar crystals may be obtained.

The liquid sulphurous acid for use may be about 10° Baumé; but for most purposes 6° will answer. Instead of a solution in water, the acid may be condensed in alcohol, which will absorb about three hundred volumes of the gas. This alcoholic solution is very useful for many purposes beside treating sugar solutions and sugars. It makes a good disinfectant and vermin-destroyer. A few drops will preserve a box of furs or clothing against all vermin.

The gas, by cold and pressure, may be liquefied, without the addition of water or other solvent, in the receiver, and may also be used to produce sulphites and bisulphites. The sulphurous acid manufactured in this way being very elastic, when put in vessels, by its outward pressure prevents the admission of air through imperfect stoppers and the like, by which sulphuric acid would be formed.

This pure sulphurous acid I propose to denominate, for commercial purposes, sulphurine.

Having thus described my invention, I claim as new and desire to secure by Letters Patent—

1. The manufacture of sulphurous acid by the decomposition of sulphate of iron with sulphur, substantially in the manner described.

2. The new article of manufacture consisting of pure sulphurous acid, made by the improved process herein described.

P. MARCELIN.

Witnesses:
T. B. MOSHER,
GEO. W. MABEE.